March 8, 1927.  
J. WEECH  
1,620,147  
SIGNALING DEVICE  
Filed Aug. 4, 1924  2 Sheets-Sheet 1
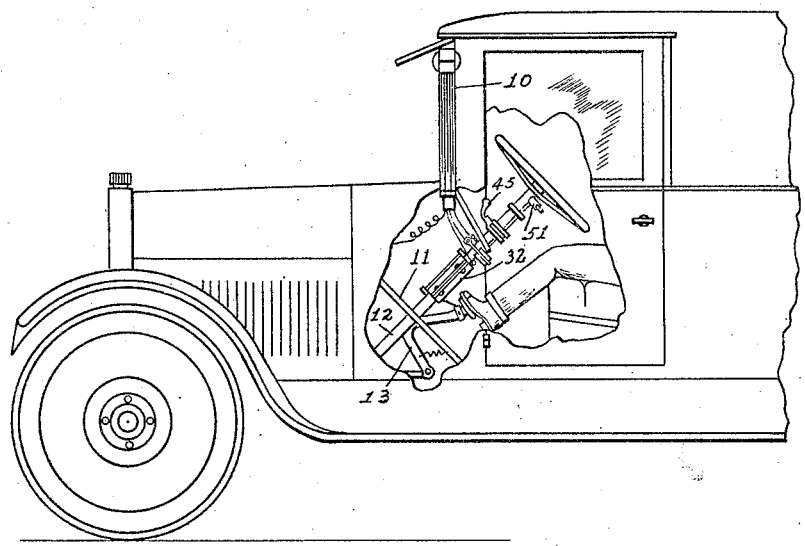
Fig. 1.
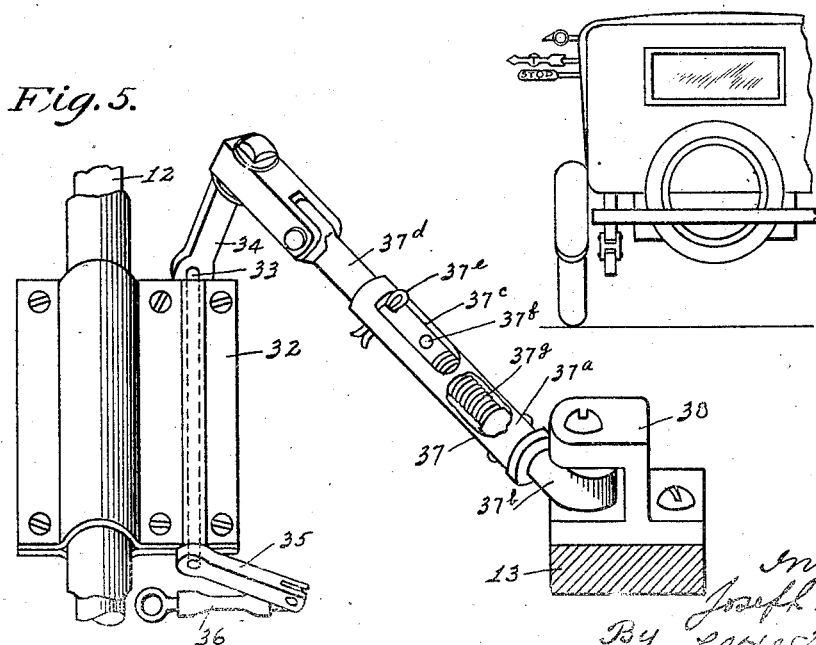
Fig. 5.
Fig. 2.

March 8, 1927. 1,620,147
J. WEECH
SIGNALING DEVICE
Filed Aug. 4, 1924 2 Sheets-Sheet 2

Inventor.
Joseph Weech
By Tefft & Tefft
Attorneys.

Patented Mar. 8, 1927.

1,620,147

UNITED STATES PATENT OFFICE.

JOSEPH WEECH, OF GALESBURG, ILLINOIS.

SIGNALING DEVICE.

Application filed August 4, 1924. Serial No. 729,895.

My invention relates to signaling apparatus for automobiles.

The purposes of my invention are to provide signaling means to indicate the course of travel by exposing, at option, signals to indicate a turn to the right, to the left, and a stop signal.

The invention is directed especially to operating means for the several signaling devices included in the general combination making up my complete structure and including the arrangements of my device in connection with the automobile body itself, and with the operating parts of an automobile.

My invention includes a supporting box or housing for signaling members adapted to be positioned at the front of the machine and in conjunction with one of the framing posts adjacent the windshield, where the operating devices may be directly under the eye of the machine driver.

Another object of the invention is the provision of push members connected with the several signaling members, adapted to function through thrust action, to accomplish the shifting of the signaling devices and to details of special structures, serving to effect thrust action of the signal operating members.

The invention also includes an automatic means for readjustment of certain of the signaling means through the operation of the automobile steering wheel.

The invention also includes tensioning means in eccentric association with certain of the members of the signaling means, adapted to supplement physical movement to effect shifting of said signaling members whereby upon initial physical shift of said members, said supplemental means may carry forward the shifting action to effect, thus automatically, the final disposition of said signaling means, either in exposed or covered position.

Referring to the drawings,

Fig. 1, is a side elevation generally of an automobile with a part broken away to disclose the relative arrangement of certain of the devices of my invention in connection with normal automobile parts.

Fig. 2, shows generally a fragmentary exposure of the rear portion of an automobile with signaling devices and light in exposure at one side, thereof.

Figure 3:
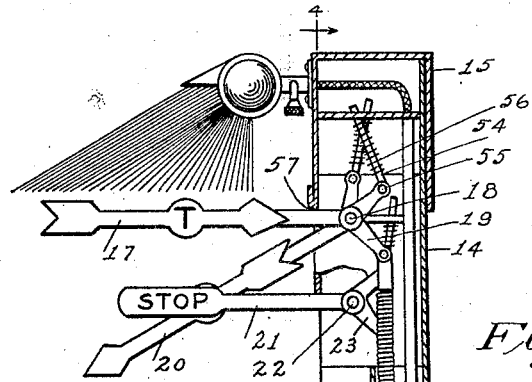
Figure 4:
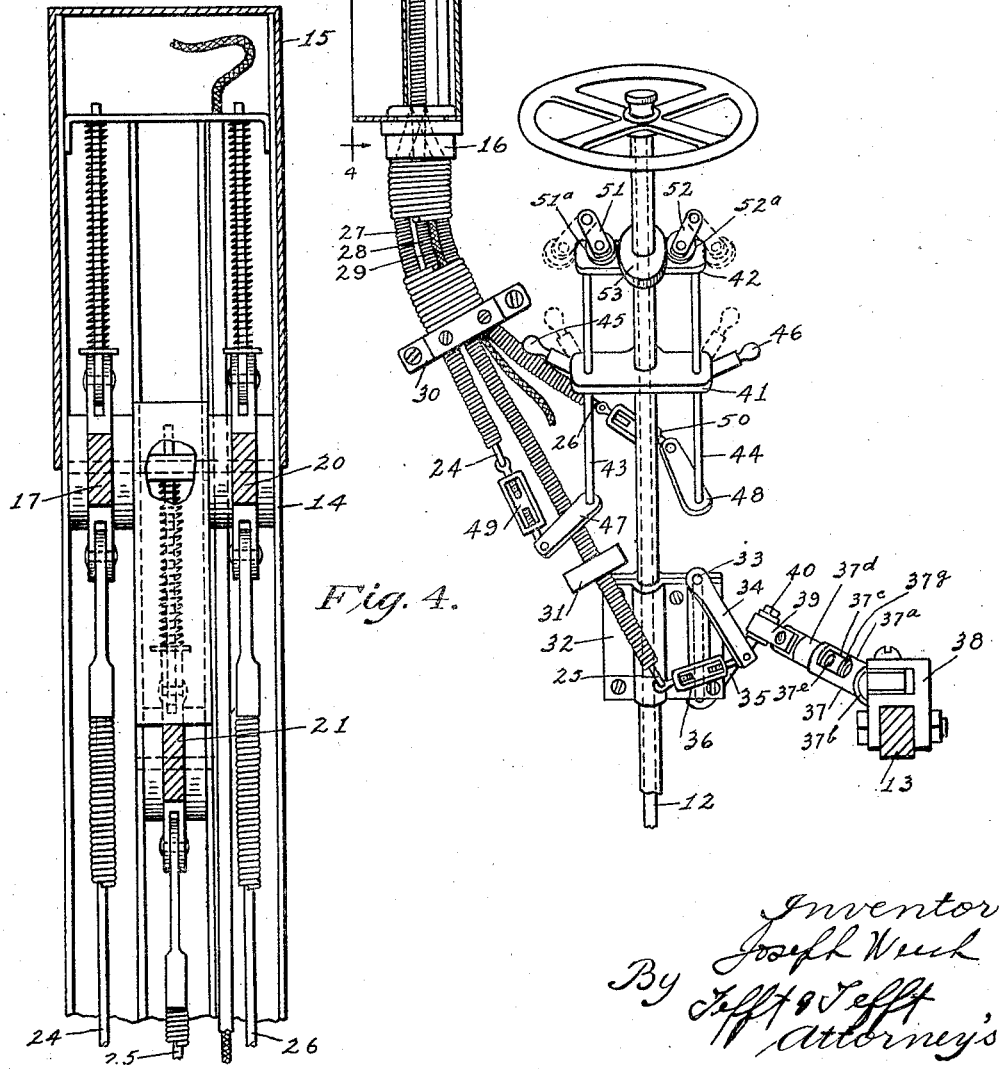

Fig. 3, is a vertical section through a housing box or container for signaling members, showing operating parts of my device in association, therewith, and also showing detailed parts including a steering wheel for an automobile and operating devices of my invention in association therewith, Fig. 4, is a vertical sectional view on the line 4—4 of Fig. 3, as looking in the direction of the arrow, and Fig. 5, is a detailed prospective view of operating means for signaling member.

Referring to the drawings, 10, refers to a corner post portion of an automobile body adjacent the windshield. 11, indicates an inclined floor portion of an automobile. 12, refers generally to a steering post, and 13, to a foot pedal. However, as matters of detail with respect to automobile parts form no part of my present invention, no further detailed reference will be made to the same.

Referring particularly to Figs. 3, and 4, 14, is a box or container for signaling devices, the same being formed preferably of sheet metal parts, having a general rectangular form and closed on all sides except at its front lower portion, the latter opening being provided to permit the swing of signal members to and from exposed position, said container or housing including a removable cap member 15, adapted for removable closure of the upper end of said box or container and 16, is an inset metal block disposed in an opening in the bottom portion of the housing and is provided with an opening therethrough to permit the entrance of operating means for the signaling members and for housing members therefor.

Referring particularly to signaling members, 17, is an arm pivoted to pin 18, fixed transversely within the container and a portion of its body being fashioned in arrow form with the point directed in a right angle direction with respect to a forwardly advanced line through said pivot and 19, is a crank arm fixed to said signaling member adapted for connection with operating means for said signaling member hereinafter to be described. 20, is a similar signaling member to that indicated as 17, similarly journalled on pin 18, and provided with a similar crank arm 19, adapted for the same operating connection as described in connection with signaling member 17, the only difference being that the arm itself is fashioned with the arrow pointing in the opposed direction to that of the pointing of the arrow in connection with signaling member 17.

21, is a stop signal bar member carrying in exposure the word "Stop". This signaling member is pivoted to transverse pin 22, suitably supported within the signal box housing and is provided with a crank arm 23, fixed thereto, the same being suitably connected with a push member for operating the stop signal.

Referring now particularly to means provided for operating the signaling members 24, 25 and 26, are rods of proper flexing capability to accommodate flexing action that attends their passage through the housing that may, in practice be required to be disposed on curved lines throughout at least a portion of their length, said rods being connected respectively rod 24, with crank arm 19, on signaling member 17, rod 26, with crank arm on signaling member 20, and rod 25 with crank arm 23 on stop signal arm 21. 27, 28, and 29, are flexible tube members (here shown as wire coils), the same being supported in fixed relation with block member 16, and extending below said block member in proper lengths to accommodate the proper support and housing of the rod members to facilitate the thrust functioning of said rod members and may be provided with supplemental supports intermediate said block member and their connection with operating members as, for instance, supports 30, and 31. Said tubular members also extending above said block and converged, as shown by dotted line in connection with said block 16, to stand in a transverse parallel line as shown within the box or container for the purpose of extending the support for said rods to substantially their point of connection with the crank members on the several signaling devices.

Referring now to the operating means for the signaling members, 32, is a clamping block fixed to a pipe on the steering post, comprising plural plates suitably secured together and properly impinging the pipe, causing said plate to be held in a stationary position.

Flanged portions of the plate members are fashioned to house a short shaft 33, to the opposite ends of which are fixed crank members 34 and 35.

36, is a turn buckle pivotally connecting the outer end of arm 34, with lower extremity of push rod 25, whereby as said arm is shifted with the turning of shaft 33, in either direction, push rod 25, will be projected either upwardly or downwardly according to the direction of turning of said shaft 33. I have arranged to turn shaft 33, to effect thrust action to rod 25, from the foot pedal 13, of an automobile and to effect this purpose, and on account of the indirectness of movement required to effect this action, I have provided a toggle arm, generally referred to as 37, pivotally connected at its outer end to a bracket member 38, adapted to be fixed in connection with a pedal part 13, and its opposed end being pivotally connected with double pivot arm 39, which said arm is likewise pivoted as at 40, upon the outer end of crank arm 35, which is fixed to shaft 33, whereby depression of the foot pedal will cause shaft 33, to be turned to effect proper thrust action of rod 25, thereby operating the stop signal to exposed position.

Toggle arm 37, is formed of a sleeve member 37$^a$ (see Fig. 5) which is fixed to a pivoting stud 37$^b$, said arm being oppositely slotted as at 37$^c$. A thrust rod member 37$^d$, which projects into said sleeve 37$^a$, is fixed in connection with the slotted portion of said sleeve by means of a cotter pin 37$^e$. Plural perforations as 37$^f$ are provided in thrust rod member 37$^d$ which are provided to facilitate relative adjustment of said rod and sleeve and a spring member 37$^g$, is interposed between the end of thrust rod member 37$^d$ and the end of stud member 37$^b$, whereby an adjustable resilient connection is established between pedal block member 38, and arm 39.

Means for effecting the operation of signal arms 17, and 20, include a frame member comprising frame parts 41, and 42, fixed to the pipe on the steering post and vertical rods 43—44 turnably supported in said framing members and having fixed thereto, striking arms 45—46, attached respectively to rods 43—44. To the lower ends of rods 43—44, are fixed crank arms 47—48 respectively to rods 43—44, the outer ends of said arms being pivotally connected respectively, arm 47 with turn buckle 49, and arm 48, with turn buckle 50, said turn buckles in turn being pivotally connected respectively with the lower ends of thrust rods 24—26, whereby when said rods 43—44 are turned, thrust rods 24—26 will be projected or retracted according to the direction of the movement of striker arms 45—46. To the upper ends of rods 43—44, are fixed crank arms 51—52, the same being provided to effect an automatic turning of rods 43—44, with the turning of the steering post. To accomplish this purpose, a cam member 53, is fixed to the steering post and positioned with respect thereto, and with respect to roller members 51$^a$ and 52$^a$, on crank members 51 and 52, that in normal position of said arms (that shown in dotted line) when the turn signals are concealed, movement of the steering post will not effect said signaling members. However, when striking arms 45—46, are actuated to expose the turn signal members (see dotted line position of striking arms), arm members 51 and 52, will be shifted to the position shown in solid lines with roller members 51ᵃ and 52ᵃ, in contact with cam member 53. When a turn to the right or left is made, the action of the steering post to effect such turn will cause a shifting of cam member 53 to cause arm members 51—52 to be shifted into their normal or dotted line position and in such shifting, will effect a similar shifting of thrust rods 24 and 26, to cause the turn signal members to be shifted to concealed positions.

As an aid or supplement to the action of shifting the several signaling members, I have provided off-centering means with respect to the pivoting of said signaling members, whereby, after manual force has been applied to turn said signaling members upon their pivotal supports beyond a certain point, then the spring action will be interposed to assist in a continuance of the movement of said arms to proper stop positions and to assist in maintaining said arms in such positions, both exposed and concealed. The particular means provided for this purpose include rod 54, having a thrust support at its upper end in a cross framing part of the container, and its lower end being pivoted to crank arm 55, fixed to signaling member 17, and 56 is a coil spring interposed between the cross framing support for rod 54 and arm 55, whereby as signal member 17 is moved to the exposed position shown in Fig. 3, it will act under the tension of spring 55, through force applied to striking arm 45, but when passed the pivoting center, then the action of the spring member will serve to carry forward the movement of said signaling arm until it strikes the framing contact point or stop 57 therefor, whereby said signal will be maintained in exposed position. With a reverse movement of striking arm 45, to the end of concealing signal arm 17, after the centering point has been passed, then the spring member will act to continue the closing movement with respect to said arm and when finally positioned within the container, will be held firmly in such concealed position through the action of said spring.

Similar off-centering spring acting devices are provided also in connection with turn signal member 20, and stop member 21, which are similarly arranged in connection with rod members and crank arms connected with each of said signaling members but to avoid confusion, another one (that in connection with signal member 17) is shown as the operation of the device, in connection with the other signal members, will be readily understood from the description herein interposed in connection with signal member 17.

What I claim is:

1. A signaling device for vehicles having in combination vertically movable turn arrow members adapted to indicate a change in the direction of the vehicle, a vertically movable stop signal member, a housing for normally enclosing said members when in a lower position and concealing the same from view, means for moving said members into an operative and indicating position, the same means including lever mechanism adjacent the steering post of the vehicle adapted to be manually operated for moving the turn arrow members, mechanism operable through the brake for raising the stop member, and mechanism adapted to return the turn arrow members to concealing position within the housing automatically by movement of the steering wheel in the direction indicated by the arrow.

2. A signaling device for motor vehicles having in combination arrow members adapted to indicate a change in direction of the vehicle, a stop member for indicating the stopping of the vehicle, a vertically extending housing, the said signaling members being enclosed by said housing and concealed thereby when in a vertical position, means for pivotally supporting the signaling device within said housing, handles located adjacent the steering wheel, flexible connections between said handles and said turn arrows whereby the arrows may be moved into a horizontal position at the will of the driver, a flexible connection between the stop member and the brake, flexible casings for enclosing said connections, and means for returning said signaling members to a concealed position within said housing after the vehicle has been turned in the direction indicated or has been stopped.

In testimony whereof I affix my signature.

JOSEPH WEECH.